US011025305B2

(12) United States Patent
Yeh et al.

(10) Patent No.: US 11,025,305 B2
(45) Date of Patent: Jun. 1, 2021

(54) SYSTEMS AND METHODS FOR A WIRELESSLY POWERED INTERACTIVE GUEST DEVICE

(71) Applicant: Universal City Studios LLC, Universal City, CA (US)

(72) Inventors: Wei Cheng Yeh, Orlando, FL (US); Travis Jon Cossairt, Celebration, FL (US); Akiva Meir Krauthamer, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/735,397

(22) Filed: Jan. 6, 2020

(65) Prior Publication Data

US 2020/0287597 A1    Sep. 10, 2020

Related U.S. Application Data

(60) Provisional application No. 62/815,190, filed on Mar. 7, 2019.

(51) Int. Cl.
*H04B 5/00* (2006.01)
*H02J 50/20* (2016.01)
(Continued)

(52) U.S. Cl.
CPC .......... *H04B 5/0037* (2013.01); *G06F 3/011* (2013.01); *G06F 3/0325* (2013.01);
(Continued)

(58) Field of Classification Search
CPC ......... H04B 5/0037; H04B 5/02; H02J 50/20; G06F 3/011; G06F 3/0325; G06F 3/0346
(Continued)

(56) References Cited

U.S. PATENT DOCUMENTS 8,362,745 B2   1/2013   Tinaphong
8,559,872 B2   10/2013  Butler
(Continued)

FOREIGN PATENT DOCUMENTS

KR      101739187 B1    5/2017

OTHER PUBLICATIONS

Shaikh Faisal Karim et al., "Energy harvesting in wireless sensor networks: A comprehensive review", Renewable and Sustainable Energy Reviews, vol. 55, Mar. 31, 2016, pp. 1041-1054.
(Continued)

*Primary Examiner* — Lee Nguyen
(74) *Attorney, Agent, or Firm* — Fletcher Yoder, P.C.

(57) ABSTRACT

A wireless power system includes a control system configured to output radio waves to an environment and a wearable device having an energy harvesting device configured to receive the radio waves and to harvest energy from the received radio waves. The wearable device also includes a processor and a sensor configured to detect a state of the wearable device and output a state signal to the processor. The processor is configured to output a device control signal based on the detected state signal. The wearable device further includes a communicator configured to receive the device control signal from the processor and to provide an output to the control system based on the state of the wearable device. At least the processor, the sensor, or the communicator receive power via the energy harvested by the energy harvesting device.

20 Claims, 5 Drawing Sheets

(51) Int. Cl.
  *G06F 3/01*     (2006.01)
  *G06F 3/03*     (2006.01)
  *G06F 3/0346*   (2013.01)
  *H04B 5/02*     (2006.01)

(52) U.S. Cl.
  CPC ............ *G06F 3/0346* (2013.01); *H02J 50/20* (2016.02); *H04B 5/02* (2013.01)

(58) Field of Classification Search
  USPC ............................................... 455/41.1–41.3
  See application file for complete search history.

(56) References Cited

U.S. PATENT DOCUMENTS

| | | | |
|---|---|---|---|
| 8,621,245 B2 | 12/2013 | Shearer et al. | |
| 9,271,242 B2* | 2/2016 | Vannithamby | .... H04W 28/0247 |
| 9,586,158 B2 | 3/2017 | Forti | |
| 2004/0214642 A1 | 10/2004 | Beck | |
| 2006/0256081 A1 | 11/2006 | Zalewski et al. | |
| 2012/0108340 A1 | 5/2012 | Ashida et al. | |
| 2013/0005249 A1 | 1/2013 | Nahidipour | |
| 2017/0230916 A1* | 8/2017 | Stein | ....................... H04W 4/38 |

OTHER PUBLICATIONS

Abhishek Borkar et al., "Optical wireless sensor network design for a conducting chamber", Local Computer Networks (LCN), Oct. 4, 2011, pp. 990-993.

Shyamal Patel et al., "A review of wearable sensors and systems with application in rehabilitation", Journal of Neuroengineering and Rehabilitation, vol. 9, No. 1, Jan. 1, 2012, p. 21.

PCT/US2020/020233 Invitation to Pay Additional Fees May 7, 2020.

* cited by examiner

SYSTEMS AND METHODS FOR A WIRELESSLY POWERED INTERACTIVE GUEST DEVICE

CROSS-REFERENCE TO RELATED APPLICATION

This application claims priority from and the benefit of U.S. Provisional Application No. 62/815,190 entitled "SYSTEMS AND METHODS FOR A WIRELESSLY POWERED INTERACTIVE GUEST DEVICE," filed Mar. 7, 2019, which is hereby incorporated by reference in its entirety for all purposes.

BACKGROUND

The present disclosure relates generally to the field of amusement parks. Specifically, embodiments of the present disclosure related to techniques to control interaction devices within an attraction.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Since the early twentieth century, amusement parks have substantially grown in popularity. To maintain this growth in popularity, new amusement park attractions are designed to provide guests with unique immersive experiences. Certain amusement park attraction enable individual interactions with the amusement park attraction to augment the immersive experience for guests. However, the immersive experience of these individual interactions may be hindered by the functionality of the devices used to interact with the amusement park attraction. For example, recognizable electronic devices (e.g., cell phones, controllers, battery-powered devices) may include functions that are accessed by guest inputs, which may decrease a guest's sense of immersion into a themed environment of the amusement park attraction. Accordingly, it is now recognizable that it is desirable to improve these amusement park attractions.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a wireless power system includes a control system configured to output radio waves to an environment and a wearable device having an energy harvesting device configured to receive the radio waves and to harvest energy from the received radio waves. The wearable device also includes a processor and a sensor configured to detect a state of the wearable device and output a state signal to the processor. The processor is configured to output a device control signal based on the detected state signal. The wearable device further includes a communicator configured to receive the device control signal from the processor and to provide an output to the control system based on the state of the wearable device. At least the processor, the sensor, or the communicator receive power via the energy harvested by the energy harvesting device.

In accordance with another embodiment, a wireless power system includes a control system configured to output radio waves to an environment, and configured to store instructions that, when executed, cause the control system to output a control system signal. The wireless power system also includes a plurality of guest devices positioned in the environment. Each guest device of the plurality of devices is configured harvest energy from the radio waves. The energy harvested from the radio waves is configured to power components of each respective guest device. Additionally, a first guest device of the plurality of guest devices is configured to receive the control system signal, activate a first device indicator responsive to receiving the control system signal, and output a secondary signal responsive to receiving the control system signal. Further, a second guest device of the plurality of guest devices is configured to receive the secondary signal, activate a second indicator of the second guest device based on the received secondary signal, and output a tertiary signal based at least in part on the received secondary signal.

In accordance with another embodiment, a wireless power system includes a control system configured to output radio waves to an environment. The wireless power system also includes a plurality of portable devices. Each portable device of the plurality of portables devices comprises an indicator and an energy harvesting device configured to receive the radio waves and convert energy from the radio waves to direct current voltage to provide power to the indicator. Additionally, a first device of the plurality of portable devices is configured to output a first device signal based at least in part on a state of the first device. Further, a second device of the plurality of portable devices comprises a near field communicator configured to receive the first device signal and activate a second device indicator based at least in part on the received first device signal.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Theme park or amusement park attractions have become increasingly popular, and various amusement park attractions have been created to provide passengers with unique immersive experiences. Certain amusement park attraction enable guests to interact with the amusement park attraction via a guest-associated device, e.g., a wireless device, to augment the immersive experience for guests. For example, a guest may access a software application on a mobile device to obtain more information about a particular attraction. However, interactions of the guest with the mobile device tend to pull guest attention away from the attraction. For example, certain attractions may have attraction environments that are rustic or historical and in which a mobile device is out of context. In addition, other guests may be distracted by the ability of more tech-savvy guests to access complex functions via a mobile device. Further, not all attractions permit guests to retain their mobile devices while in the attraction.

Provided herein are wirelessly-powered guest devices that operate wirelessly and that are configured with dedicated functionality that operates in conjunction with one or more attractions in an amusement park. In certain embodiments, the functionality may be automatically activated at appropriate times in the attraction or upon certain guest interactions with the attraction, such that the guests need manipulate or provide user inputs to activate the functions of the guest devices. In this manner, the guest attention is not pulled from the attraction. Such devices may be relatively simple to reduce costs and/or weight. For example, the devices may be powered by energy harvested by a wireless communicator without additional weight of a battery. Further, the components of the wirelessly-powered device may be housed in various themed devices (e.g., amulets, rings, bracelets, torches, wands, teddy bears, etc.) such that the guest may interact with the amusement park attraction using a themed device. Additionally, the wirelessly-powered device may be configured to interact with the amusement park attraction, as well as with other wirelessly-powered devices, to augment the immersive experience.

Figure 1:
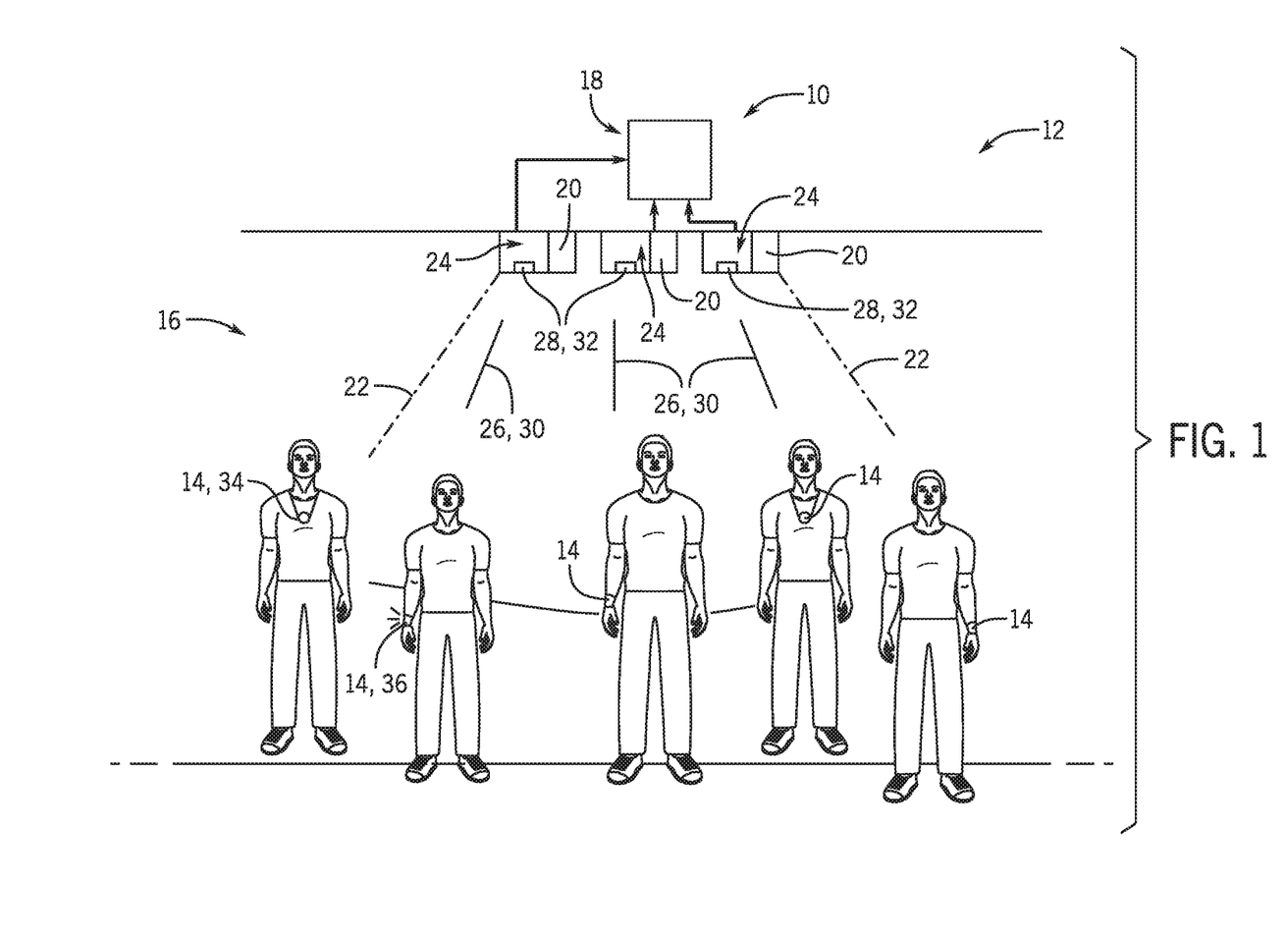
FIG. 1 is a perspective view of an embodiment of a wireless power system.

FIG. 1 is a perspective view of an embodiment of a wireless power system 10 for an amusement park attraction 12. The wireless power system 10 may be positioned to provide wireless power to guest devices 14 located in an environment 16 (e.g., a portion of a ride track, a room, etc.) of the amusement park attraction 12. In some embodiments, the wireless power system 10 is configured to provide wireless power to the guest devices 14 (e.g., the wirelessly-powered devices) throughout the entire amusement park attraction 12 and/or throughout the amusement park. The wireless power system 10 includes a control system 18 that has an emitter 20 configured to output radio waves 22 to the environment 16. The radio waves 22 provide the wireless power to the guest devices 14. Additionally, the control system 18 may include communication circuitry 24 (e.g., transceiver 32) configured to send communication signals 26 to the guest devices 14. The communication circuitry 24 may also be configured to receive communication signals from the guest devices 14 via a detector 28 of the communication circuitry 24.

In the illustrated embodiment, the environment 16 has multiple emitters 20 and communication circuitry 24, which may improve power emission and communication between the control system 18 and the guest devices 14. As set forth above, the transceivers of the communication circuitry 24 may be configured to output the communication signal 26 (e.g., a control system signal 30). The control system signal 30 may be an infrared signal. Positioning multiple transceivers 32 around the environment 16 at various orientations may improve communication between the control system 18 and the guest device 14 when using infrared signals by causing the guest device 14 to remain within range or line-of-sight with at least one of the multiple transceivers 32.

The guest devices 14 may be provided to guests at the amusement park attraction 12. The guest devices 14 may be themed devices specific to a theme of the amusement park attraction 12. For example, the guest device 14 may be in the form of a torch for an underground treasure expedition themed amusement park attraction. When the guest moves the guest device 14 (e.g., the torch) to a position proximate a thematic heat source (e.g., campfire special effect) of the environment 16, the control system 18 may output the control system signal 30 causing the guest device 14 (e.g., torch) light up. In some embodiments, each guest may have a different guest device 14. For example, a first guest device 34 may be an amulet and a second guest device 36 may be a bracelet.

Figure 2:
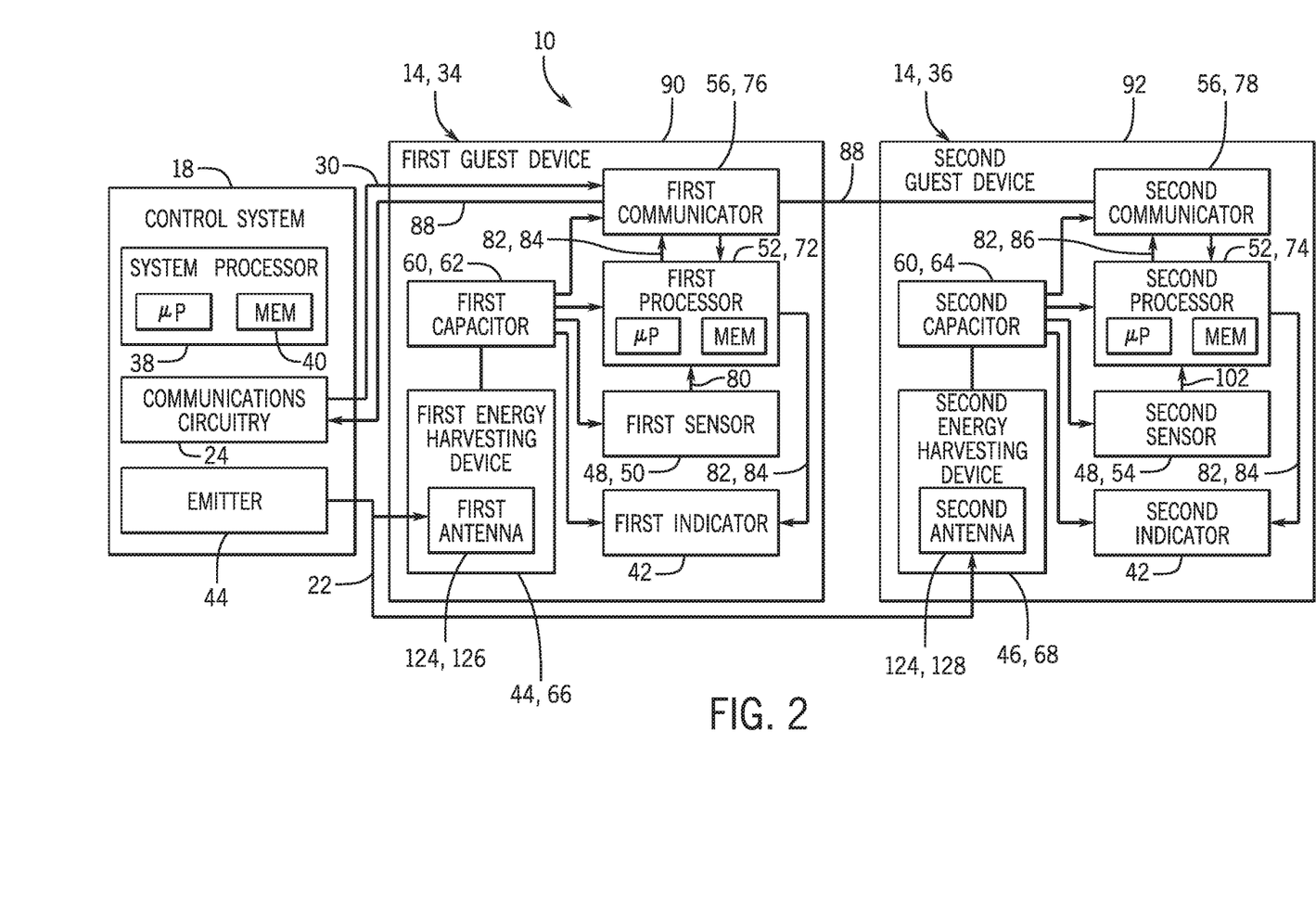
FIG. 2 is a block diagraph of an embodiment of a control system and guest devices of the wireless power system of FIG. 1.

FIG. 2 is a block diagram of an embodiment of the control system 18 and the guest devices 14 of the wireless power system 10. The control system 18 is configured to provide wireless power to the guest devices 14. Further, the control system 18 is configured to communicate with the guest devices 14. The control system 18 may include communication circuitry 24 such as antennas, radio transceiver circuits, and signal processing hardware and/or software (e.g., hardware or software filters, A/D converters, multiplexers amplifiers), or a combination thereof, and that may be configured to communicate over wireless communication paths via Infrared (IR) wireless communication, satellite communication, broadcast radio, Microwave radio, Bluetooth, Zigbee, Wifi, UHF, NFC, etc. In one embodiments, the communication circuitry 24 includes a plurality of IR transceivers disposed in the environment of the amusement park attraction.

The control system 18 may include a system processor 38 and a memory 40. The system processor 38 may include one or more processing devices, and the memory 40 may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired program code in the form of machine-executable instructions or data structures and which can be accessed by the system processor 38 or by other processor-based devices (e.g., mobile devices). In some embodiments, the memory 40 is configured to store instructions executable by the system processor 38 to output various control system signals 30. For example, the system processor 38 may execute instructions to output a control system signal 30 to activate an indicator 42 of the first guest device 34 based on communication from the first guest device 34, other guest devices 14, and/or data from timers, attraction event schedules, etc.

The control system 18 may include an emitter 44. The emitter 44 is configured to output the radio waves 22 to provide wireless power to the environment 16. In some embodiment the radio waves 22 are ultra-high frequency radio frequency identification waves (UHF RFID). However, any type of suitable radio wave 22 may be emitted to provide wireless power to the environment. In some embodiments, the control system 18 may have multiple emitters 44.

The guest device 14 is configured to receive power from the control system 18 via its respective energy harvesting device 46 (e.g., a first energy harvesting device 66, a second energy harvesting device 68, etc.). The energy harvesting device 46 is configured to receive the radio waves 22, via an antenna 124 (e.g., a first antenna 126, a second antenna 128, etc.), emitted from the emitter 44 of the control system 18 and to harvest energy from the radio waves 22. In some embodiments, the energy harvested from the radio waves 22 is output directly to components of the guest device 14 (e.g., a sensor 48, a processor 52, a communicator 56, etc.) However, in some embodiments, the guest devices 14 includes a capacitor 60 (e.g., first capacitor 62, second capacitor 64, etc.) configured to receive the energy from the energy harvesting device 46 before outputting the energy to the components of the guest device 14. However, the guest devices 14 does not have a battery configured to store the energy from the energy harvesting device 46. Further, the guest devices 14 does not have a battery, such that no component of the guest device 14 is battery powered. Additionally, the guest device 14 is not powered by a wired connection.

The guest device 14 has the sensor 48 (e.g., a first sensor 50, a second sensor 54, etc.) configured to detect a state of the guest device 14. The sensor 48 may be configured to output a state signal 80 based on the detected state of the guest device 14. In some embodiments, the sensor 48 is a position sensor configured to detect a position of the guest device 14. The position sensor may be configured to output the position of the guest device 14 via the state signal 80. In other embodiments, the sensor 48 may be an accelerometer, a gyroscope, pressure sensor, optical sensor, acoustic sensor, an infrared sensor, or some combination thereof.

The guest device 14 may include the processor 52 (e.g., a first processor 72, a second processor 74, etc.) configured receive the state signal 80 from the sensor 48. The processor 52 may be configured to generate and output a device control signal 82 (e.g., a first device control signal 84, a second device control signal 86, etc.) based on the state signal 80 and/or other inputs. The processor 52 may be a microprocessor. In some embodiments, the guest device 14 is configured to operate without a memory device. In other embodiments, the guest device 14 includes a memory device for storing instructions executable by the processor 52 of the guest device 14 to output various device control signals 82.

The guest device 14 may include communications circuitry having the communicator 56 (e.g., a first communicator 76, a second communicator 78, etc.) configured to receive the device control signal 82 from the processor 52 and to provide an output 88 to the control system 18 and/or other guest devices 14 based on the state of the guest device and/or other inputs. In some embodiments, the communicator 56 includes a long range communicator and/or near field communicator. In another embodiment, the communicator 56 includes a medium range communicator.

In some embodiments, the communicator 56 (e.g., the first communicator 76, the second communicator 78, etc.) includes infrared light emitting diodes configured to output an infrared signal to the detector of the control system 18. The infrared signal is configured to transmit information between the guest device 14 and the control system 18. In some embodiments, the infrared signal output from the guest device 18 is configured to transmit information to other guest devices 14. The communicator 56 may be configured to receive communication via infrared signals such that the communicator 56 may receive communication from the control system 18 and/or other guest devices 14 via infrared signals.

In some embodiments, the control system 18 is configured to emit infrared light to the environment 16. The communicator 56 may be configured transmit information to the control system 18 and/or other guest devices 14 using an electrically switchable reflector. The electrically switchable reflector may be configured to selectively reflect the infrared light emitted from the control system 18 to the environment. The electrically switchable reflector may selectively reflect the infrared light with a pattern or sequence configured to transmit information from the guest device 14. The control system 18 and/or other guest devices 14 may be configured to receive the selectively reflected infrared light and determine the information from the guest device 14 based on the pattern or sequence. The electrically switchable reflector may have a reflective surface configured to rotate to control an angle of reflection of the infrared light to generate the pattern or sequence.

In some embodiments, the communicator 56 is configured to selectively filter the infrared signal to generate a filtered infrared signal and to reflect the filtered infrared signal to a detector of the control system 18. The filtered infrared signal may be configured to transmit information from the guest device 14 to the control system 18 and/or other guest devices 14. In another embodiment, the communicator 56 includes a reflective surface and an occluding device configured to selectively block one or more portions of the reflective surface to form a reflective pattern configured to reflect the infrared light to the control system 18 and/or other guest devices 14. For example, the occluding device may cover a reflective surface having four reflective portions arranged in a two by two grid. The occluding device may block a top left reflective portion such that only the other three reflective portions reflect the infrared light. Selectively covering different portions of the reflective surface with the occluding device can convey different information. The communicator 56 may be configured to transmit information from the guest device 14 to the control system 18 and/or other guest devices 14 via the occluding device selectively covering different portions of the reflective surface.

In some embodiments, at least the first energy harvesting device 66, the first processor 72, the first sensor 50, and the first communicator 76 are all housed within a first housing 90 of the first guest device 34. Similarly, at least the second energy harvesting device 68, the second processor 74, the second sensor 54, and the second communicator 78 are all housed within a second housing 92 of the second guest device 36.

Figure 3:
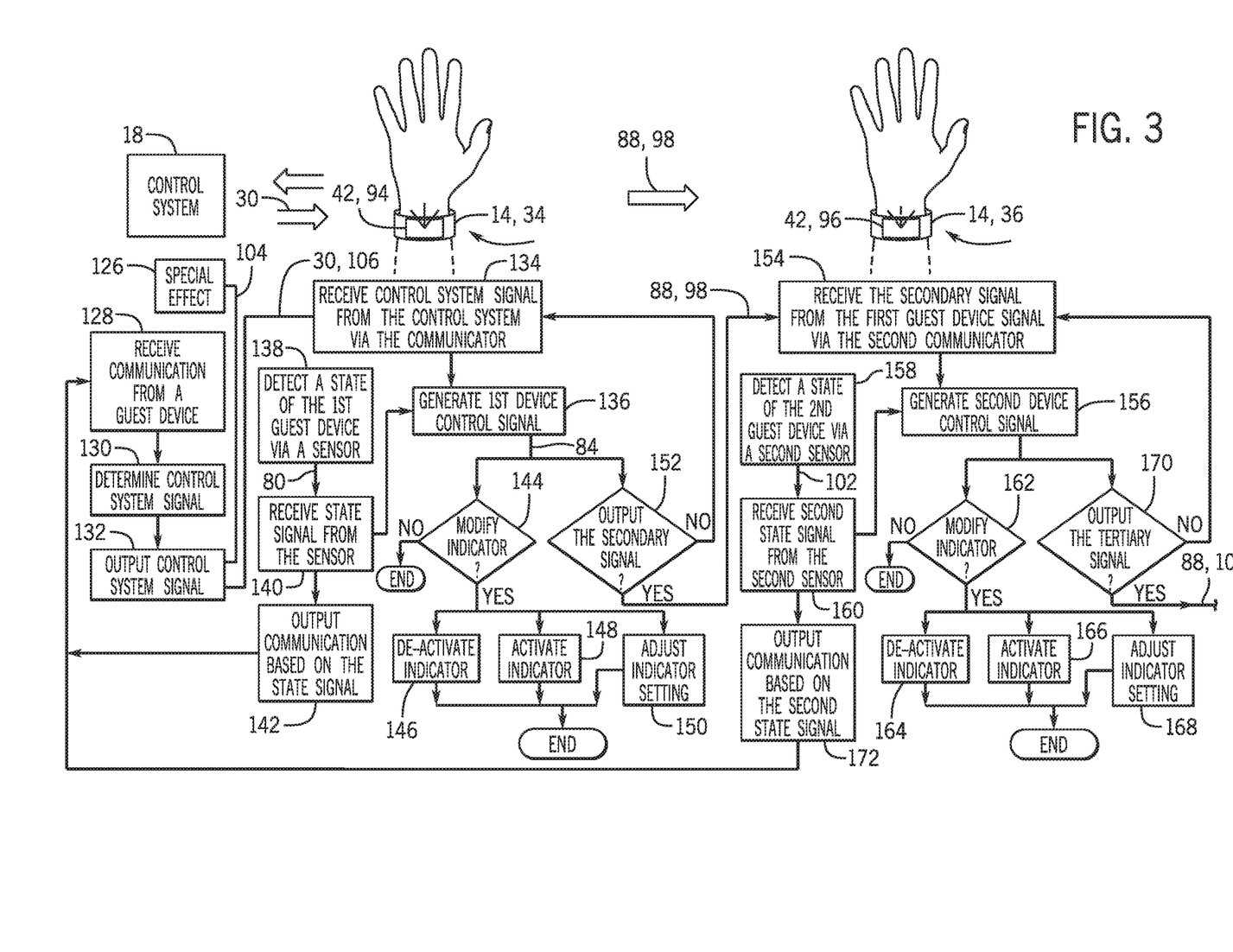
FIG. 3 is a flow diagraph of an embodiment of communication between the control system and the guest devices.

FIG. 3 is a flow diagram of an embodiment of communication between the control system 18 and the guest devices 14. The control system 18 is configured to store instructions that, when executed, cause the control system 18 to output the control system signal 30. The control system 18 may be configured to execute the instructions based on a timer or attraction event. For example, the amusement park attraction may be configured to cause a special effect (e.g., gust of wind) to occur at a predetermined time. The control system 18 may be configured output the control system signal 30 configured to cause the guest devices 14 (e.g., torches) to go out (e.g., turn off the indicator 42) in response to the special effect (e.g., the gust of wind). In another embodiment, the control system 18 is configured to receive communication from the guest device(s) 14 (block 128). The control system is configured to determine the control system signal 130 from the instructions executed based on communication received from the guest device(s) 14 (block 130). The instructions may cause the control system to output the control system signal 30 (block 132). The control system signal 30 may be configured to cause the guest devices 14 (e.g., torches) light up. The control system 18 may include multiple instructions each configured to execute based on different conditions or triggers (e.g., timers, ride events, communication received, etc.).

The first guest device 34 may be configured to receive the control system signal 30 from the control system 18 (block 134). In response to receiving the control system signal 30, the first processor is configured to generate the first device control signal 84 (block 136). In some embodiments, the first processor is configured to generate the device control signal 84 based on both the control system signal 30 and a first state signal 80 from the first sensor 48. The first sensor may detect a state of the first guest device (block 138) and output the first state signal to the first processor indicating the state of the first guest device. The first processor is configured to receive the state signal from the first sensor (block 140). For example, the control system 18 may output a control system signal 30 configured to light up the first guest device 34. However, the first guest device 34 (e.g., torch) may be positioned or may have recently been positioned in a thematic water source causing the first guest device 34 to be "wet" or have a wet state. The first processor may determine that the first guest device 34 (e.g., torch) cannot light up because the first guest device 34 is "wet," and send the first device control signal 84 to cause the first guest device 34 briefly light up and then go out or to remain unlit based on both the control system 30 and the state signal 80. In another example, the guest may rapidly move the first guest device 34 (e.g., torch) through the thematic heat source. Although the control system signal 30 is configured to cause the first guest device 34 (e.g., torch) to light up when the first guest device 34 is positioned proximate the thematic heat source. The first processor may determine, based on the velocity of the first guest device 34 from the state signal 80, that the first guest device 34 (e.g., torch) cannot be lit.

In some embodiments, the first guest device 34 is configured to output the state signal 80 from the first sensor 50 to the control system 18 (block 142). As set forth above, the state signal 80 may cause the control system 18 to execute various instructions. The control system 18 may be configured to output the control system signal 30 when the first guest device 34 is positioned in a particular area of the environment 16 of the amusement park attraction 12 (e.g., proximate the thematic heat source). Additionally, the control system 18 may be configured to the output control system signal 30 based on other states (e.g., positions, movement, etc.) of the first guest device 34. The control system 18 may be configured to output the control system signal 30 based on a position, acceleration, velocity, pressure, temperature, acoustic, logical state, etc. of first guest device 34.

The first processor 72 may be configured to output the first device control signal 84 to modify a first indicator 94 of the first guest device 34 (block 144). The first device control signal 84 may de-activate the first indicator 94 (block 146), activate the first indicator 94 (block 148), or adjust settings of the first indicator 94 (block 150). For example, the first indicator 94 may be an LED light, where de-activating the first indicator 94 causes the LED light to turn off, activating the first indicator 94, causes the LED light to turn on, and adjusting the settings of the first indicator 94 may cause the LED to dim, brighten, change colors, etc.

The first processor may be configured to output the first device control signal 84 to the first communicator of the first guest device 34. The first communicator may be configured to output a secondary signal 98 in response to receiving the first device control signal 84 (block 152). The secondary signal 98 may be configured to relay information from the first control system signal 84 to another guest device 14 (e.g., the second guest device 36). The second guest device 36 may be configured to receive the secondary signal 98 (block 154) and activate the second indicator 96 of the second guest device 36 based on the secondary signal 98. For example, the first guest device 34 and the second guest device 36 may be torches. As set forth above, the first guest device 34 (e.g., torch) may light up based on the control system signal 30 when the first guest device 34 is positioned proximate a thematic heat source (e.g., campfire). The first guest device 34 may then be configured to output the secondary signal 98, such that the first guest device 34 may cause the second guest device 36 (e.g., torch) to light up when the second guest device 36 is moved to a position proximate the first guest device 34; thereby, creating a special effect of a torch lighting another torch.

In some embodiments, the second processor of second guest device 36, similar to the first processor 72 of the first guest device 34, may generate a second device control signal 86 (block 156) based on both the secondary signal 98 and a second state signal 102 detected from the second sensor 54 (block 158) and received by the second processor (block 160). The second device control signal 86 may modify a second indicator 96 of the first guest device 34 (block 162). The second device control signal 84 may de-activate the first indicator 94 (block 164), activate the first indicator 94 (block 166), or adjust settings of the first indicator 94 (block 168). Additionally, the second guest device 36 may be configured to output a tertiary signal 100 via the second communicator (block 170) such that the second guest device 36 (e.g., torch) may cause a third guest device (e.g., torch) to light up. Further, the second guest device 36 may be configured to output the second state signal 102 from the second sensor 54 to the control system 18 (block 172).

In some embodiments, the control system 18 may be configured to output the control system signal 30 based on the state of multiple guest devices 14. Further, the control system 18 may be configured to communicate with a special effect device of the amusement park attraction 12. For example, a first guest having the first guest device 34 and second guest having a second guest device 36 may stand proximate to a special effect device 126 (e.g., trap door) in an environment of the amusement park attraction. The trap door may be configured to open may at least two guests a positioned proximate to the trap door. The first and second guest devices 34, 36 may output their respective states (e.g., the positions of the guest devices) to the control system 18. The control system 18 may be configured to output a first control system signal 104 to the special effect device 126 (e.g., trap door) causing it to open. In some embodiments, opening the trap door may cause a special effect event (e.g., a gust of wind), thus, the control system 18 may output a second control system signal 106 to the first and/or second guest devices 34, 36 causing the guest devices to de-activate their respective indicators 94, 96 to "put out" the guest devices 34, 36 (e.g., torches). In some embodiments, the control system 18 outputs the control system signal 30 to all guest devices 14 in the environment 16 simultaneously to de-activate the respective indicators of all the guest devices 14. However, in some embodiments, the control system 14 is configured to output the control system signal 30 to the guest device 14 (e.g., the first guest device) positioned closest to the special effect device 126 (e.g., trap door). The special effect (e.g., gust of wind) may originate from the trap door. Thus, to imitate the effect of a real gust of wind on torches, the first guest device 34 will de-activate the first indicator 94. Then the first guest device 34 may output the secondary signal 98 to the guest device 14 (e.g., second guest device 36) positioned closest to the first guest device 34. Each guest device 14 may be configured receive and output the instructions to de-activate the respective indicators 42 to cause a time-delayed reaction to the special effect gust of wind. The processors may be configured to delay output 88 to other guest devices 14 to increase lengthen the time-delayed reaction.

The present techniques may be used to trigger a cascading activation effect among a group of guest devices 14, in which only some devices (i.e., only a subset of all of the guest devices 14) respond to an initial control system signal 30, transmitted at a first time point, and the response is an activation of a particular device functionality on only the subset of activated devices. These activated devices 14, in turn, send out their own activation signals to a different subset of the devices 14, at a subsequent time point. The cascade may continue until all devices 14 in the environment are activated. In one example, a wave or light cascade in the device 14 may be created by using the cascade-type activation. In certain embodiments, the cascade is activated automatically in the environment with no manipulation of the device 14 by the user.

The selection of activation order of the subsets of the devices 14 may be based on proximity to a sensor or may be based on user information associated with each individual device 14. In some embodiments, the control system 18 is configured to output the control system signal 30 to the entire environment, such that the first guest device 34 may receive the control system signal 30 anywhere in the environment 16. However, in some embodiments, the control system signal 30 is configured to cause a response in only the first guest device 34 and/or in only a subset of the guest devices 14 (e.g., chosen randomly or by device type). Each guest device 14 may have an individual identification such that the control system 18 may send control system signals 30 to particular guest devices 14. Thus, the second guest device 36 may not be responsive to a control system signal output 30 intended for the first guest device 34, such that the second indicator 96 is not activated in response to receiving the control system signal 30. Similarly, the first guest device 34 may not be responsive to control system signals 30 output for the second guest device 36, the third guest device, etc. The control system 18 alternatively or additionally may determine to which guest device 14 to send the control system signal based on the individual states of each of the guest devices 14.

In some embodiments, the first guest device 36 is nonresponsive to the secondary signal 98 and the tertiary signal 100 such that the first indicator 94 is not activated in response to the secondary signal 98 or the tertiary signal 100. For example, the control system signal 30 may be configured to cause the first guest device 34 to temporarily light up. The first guest device 34 may then output the secondary signal 98 to cause the second guest device 36 to temporarily light up. The second guest device 36 may then output the tertiary signal 100. Although the first guest device 34 may be within range of the tertiary signal 100, the first guest device 34 may not light up again in response to the tertiary signal 100.

Each guest device 14 may be configured to switch between a plurality of communication states. The guest device 14 may be configured receive different information based on a current communication state of the guest device 14. For example, the guest device 14 may be configured to only receive certain signals in a first communication state and receive other signals in other communication states (e.g., second communication state, third communication state, etc.). Further, the guest device 14 may be configured transmit different information based on a current communication state of the guest device 14. For example, the first guest device 34 may be configured to output the secondary signal 98 with instructions to cause the second guest device 36 to activate the second indicator 96 in the first communication state, and to output the secondary signal 98 with instructions to cause the second guest device 36 to de-activate the second indicator 96 in the second communication state. Further, in some embodiments, the first communication state may be configured to disable receiving and/or transmitting from the communicator 56, and the second communication state may enable receiving and/or transmitting from the communicator 56.

In some embodiments, the first guest device 34 may switch from a first communication state to a second communication state, or vice versa, in response to receiving the control system signal 30. Further, the second guest device 36 may switch from the first communication state to the second communication state, or vice versa, in response to receiving the secondary signal 98. The control system 18 may be configured to output control system signals 30 to each guest device 14 in the environment 16 to switch/control the communication state of the respective guest devices 14. The control system 18 may be configured to switch/control the communication state of the respective guest devices 14 based on the states of the respective guest devices 14. For example, the control system 18 may be configured to output a control system signal 30 to the first guest device 34 to disable transmitting of the secondary signal 98 when the state signal 80 received by the control system 18 from the first guest device 34 indicates that the first guest device 34 is positioned in a particular area of the environment 16.

Figure 4:
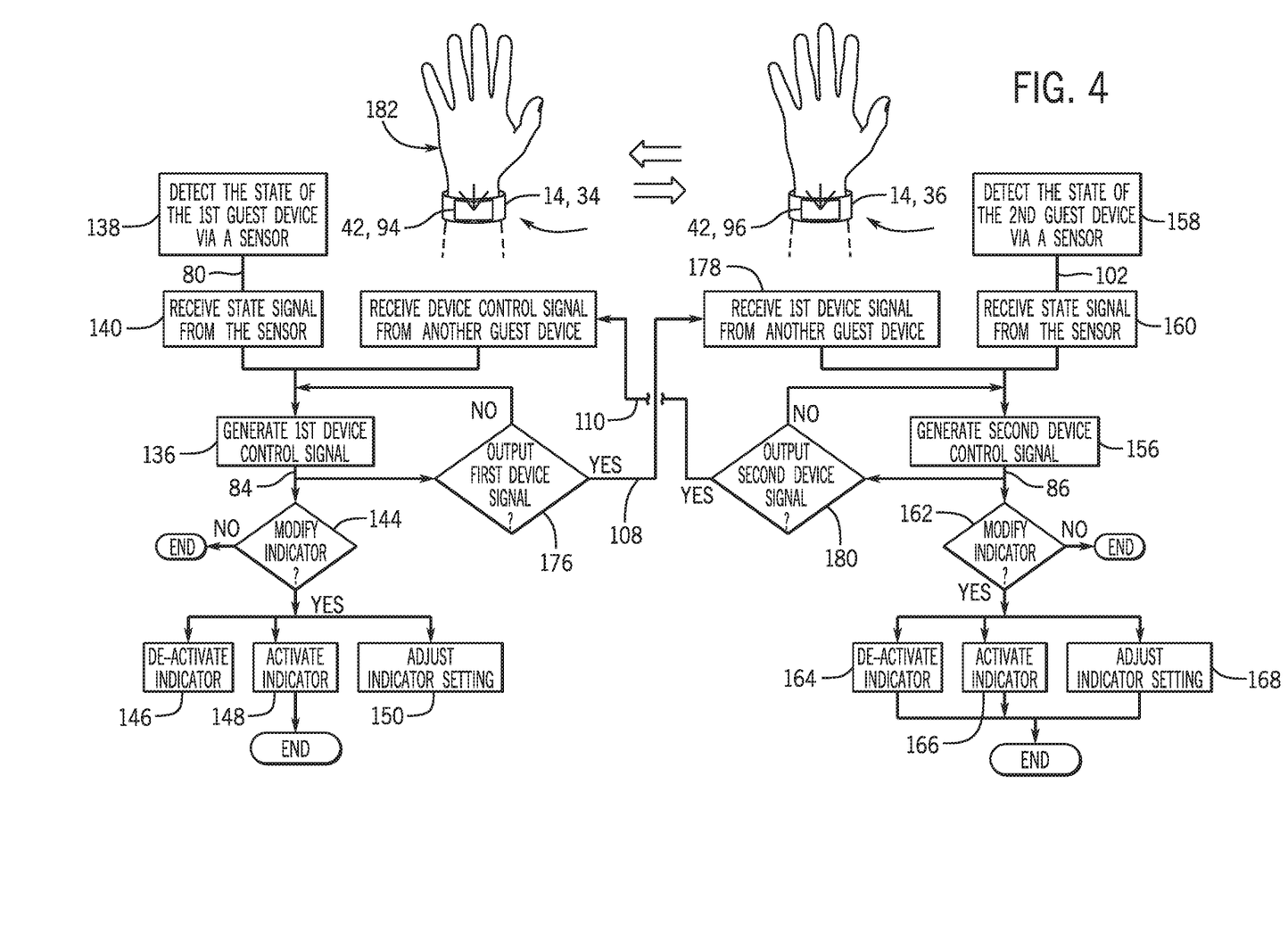
FIG. 4 is a flow diagraph of an embodiment of communication between the guest devices.

FIG. 4 is a flow diagram of an embodiment of communication between the guest devices 14. In the illustrated embodiment, the first guest device 34 and the second guest device 36 (e.g., wearable devices) are communicating with each other. The guest devices 14 may communicate with each other independent of communication from the control system. In some embodiments, the control system may be primarily configured to provide power to the guest devices 14. As set forth above, the control system is configured to output radio waves to an environment via the emitter. The guest devices 14 (e.g., portable devices) each have the energy harvesting devices configured to receive the radio waves and convert energy from the radio waves to direct current voltage to provide power to the respective indicators 42 of the guest devices 14, as well as to other components of the guest devices 14.

As set forth above, the guest devices 14 may be configured to interact or communicate with each other independent of communication from the control system. Communication between the guest devices 14 may be based on the respective states of the guest devices 14. As set forth above, the first sensor of the first guest device 34 may detect the state of the first guest device 34 (block 138) and output the state signal 80 to the first processor of the first guest device 34. The first processor may receive the state signal 80 from the first sensor (block 140). The first processor may be configured to generate the first device control signal 84 based on the state of the first guest device 34 (block 136). The first device control signal 84 may modify the first indicator 94 (block 144) (e.g., activate (block 148), de-activate (block 146), adjust indicator settings (block 150), etc.). The first device control signal 84 may also be configured to cause the first communicator to output a first device signal 108 (block 176). The first communicator may be a near field communicator.

The second guest device 36 may be configured to receive the first device signal 108 via the second communicator (block 178). The second communicator may also be a near field communicator. The second sensor of the second guest device 36 may detect the state of the second guest device 36 (block 158) and output the second state signal 102 to the second processor 74 of the second guest device 36. The second processor may receive the second state signal 102 from the first sensor (block 160). The second processor may be configured to generate the second device control signal 86 based on both the state of the second guest device 36 and the first device signal 108 (block 156). The second device control signal 86 may modify the second indicator 96 (block 162) (e.g., activate (block 166), de-activate (block 164), adjust indicator settings (block 168), etc.). The second device control signal 86 may also be configured to cause the second communicator to output a second device signal 110 (block 180).

In some embodiments, the first guest device 34 is configured to receive the second device signal 110. The first processor 72 of the first guest device 34 is then configured to determine the first device control signal 84 based on both the state of the first guest device 34 and the second device signal 110. However, in another embodiment, the third guest device is configured to receive the second device signal 110.

In some embodiments, the guest may initiate communication between the guest devices 14. For example, a first guest 182 may move the first guest device 34 in a particular pattern. The first sensor of the first guest device 34 may detect and output the pattern (e.g., positions over time, velocity over time, etc.) to the first processor via the state signal 80. The first processor is configured to recognize the pattern and cause the first guest device 34 to output the first device signal 108 based on the user-initiated pattern of the first guest device 34. The first device signal 108 may be configured to cause the second indicator 96 of the second guest device 36 to light up. In some embodiments, the first processor is configured to recognize multiple patterns.

Figure 5:
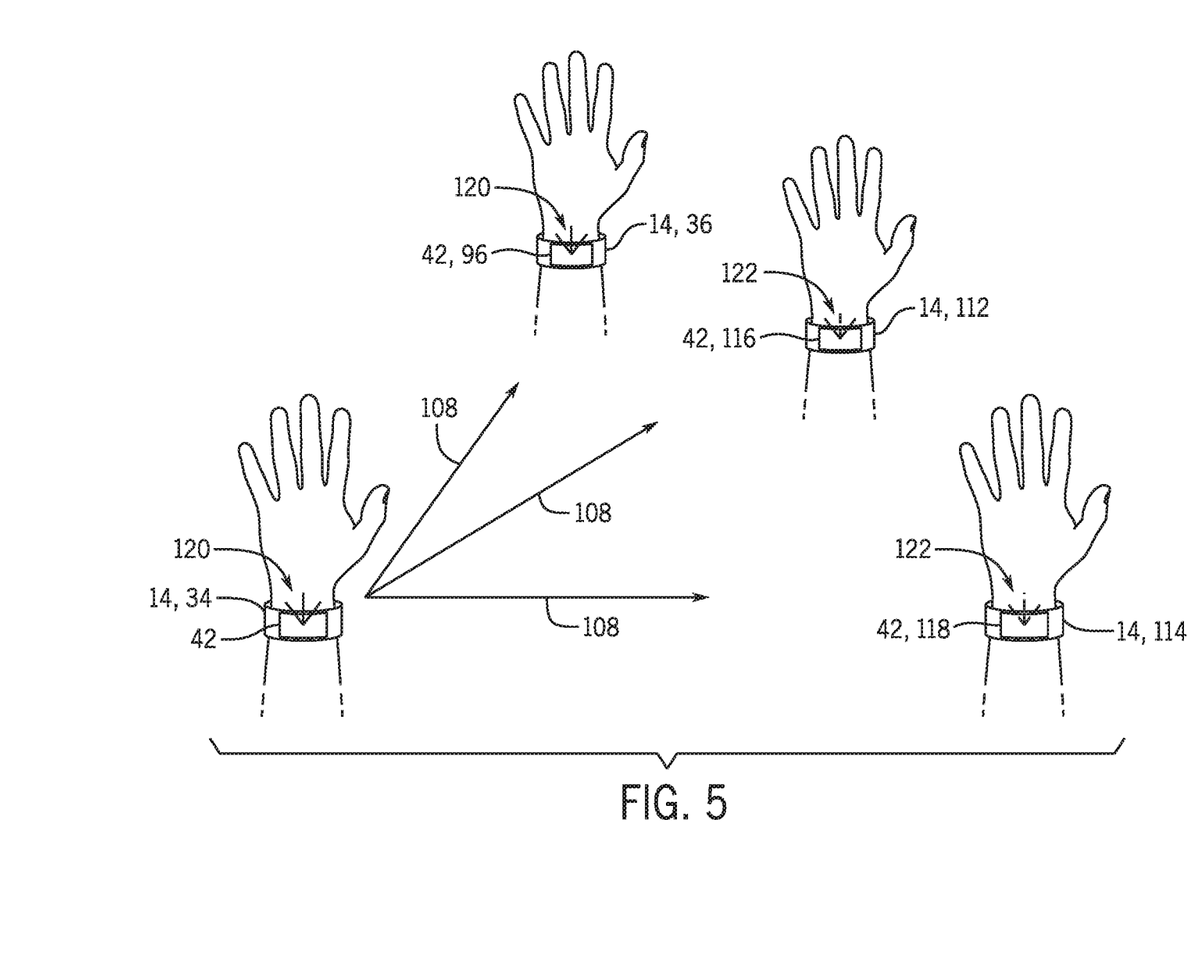
FIG. 5 is a perspective view of another embodiment of communication between the guest devices.

FIG. 5 is a perspective view of another embodiment of communication between the guest devices 14. As set forth above, the first guest device 34 may be configured to output the first device signal 108. In the illustrated embodiment, the first device signal 108 is configured to be output to multiple guest devices 14, such that the second guest device 36, the third guest device 112, and a fourth guest device 114 are configured to receive the first device signal 108. However, each of the guest devices 14 may have different reactions to the first device signal 108. The second guest device may activate the second indicator 96 in response to the first device signal 108. The second indicator 96 may be an LED light emitting blue light 120. The third guest device 112 and the fourth guest device 114 may activate their respective indicators 116, 118 (e.g., LED lights) to emit red light 122 in response to the first device signal 108. The indicators 42 may activate differently based on their respective device control signals. Further, the indicators 42 may activate differently to provide an indication of the state of the guest device 14. The indicators 42 may include uni-color light emitting diodes, multi-color light emitting diodes, an audio output device, or some combination thereof. In some embodiments, the indicators 42 include sound devices, haptic devices, or any other type of special effects. The indicators 42 may include a combination of multiple special effects.

In another embodiment, the indicators 42 are configured to activate based on an individual identification (ID) of the respective guest device 14. The guests may have individual ID's that are saved to their respective guest devices 14. In some embodiments, the guests may be split up into teams based on their IDs. The IDs may cause the guest devices 14 to interact in a particular way with the control system and/or with other devices 14. For example, the first guest and second guest may be on a first team, and a third guest and a fourth guest may be on a second team, such that the first device signal 108 emitted from the first guest device 34 corresponding to the first guest may elicit a different response from the second guest device 36 than from the third guest device 112 and the fourth guest device 114. The second guest device 36 may emit a blue light 120 in response to the first device signal 108 and the second and third guest devices 112, 114 may emit red light 122 in response to the first device signal 108 because of the corresponding teams of the guest devices 14.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A wireless power system, comprising:
   a control system configured to output radio waves to an environment, and configured to store instructions that, when executed, cause the control system to output a control system signal; and
   a plurality of guest devices positioned in the environment, wherein each guest device of the plurality of devices is configured harvest energy from the radio waves, wherein the energy harvested from the radio waves is configured to power components of each respective guest device;

wherein a first guest device of the plurality of guest devices is configured to receive the control system signal, activate a first device indicator responsive to receiving the control system signal, and output a secondary signal responsive to receiving the control system signal; and wherein a second guest device of the plurality of guest devices is configured to receive the secondary signal, activate a second indicator of the second guest device based on the received secondary signal, and output a tertiary signal based at least in part on the received secondary signal.

2. The wireless power system of claim 1, wherein the second guest device is nonresponsive to the control system signal such that the second indicator is not activated in response to the control system signal.

3. The wireless power system of claim 2, wherein the first guest device is nonresponsive to the secondary signal and the tertiary signal such that the first indicator is not activated in response to the secondary signal or the tertiary signal.

4. The wireless power system of claim 1, wherein the first guest device switches from a first state to a second state in response to receiving the control system signal, and wherein the second guest device switches from the first state to the second state in response to receiving the secondary signal.

5. The wireless power system of claim 1, wherein the first guest device and the second guest device of the plurality of guest devices each comprise a capacitor configured to store the harvested energy and configured to output the harvested energy to provide power to the components.

6. The wireless power system of claim 1, wherein the control system signal is an infrared signal.

7. The wireless power system of claim 6, wherein the first guest device of the plurality of guest devices comprises at least one electrically-switchable reflector configured to selectively reflect the infrared signal to a detector of the control system.

8. The wireless power system of claim 6, wherein the first guest device of the plurality of guest devices is configured to selectively filter the infrared signal to generate a filtered infrared signal and to reflect the filtered infrared signal to a detector of the control system.

9. The wireless power system of claim 6, wherein the first guest device of the plurality of guest devices comprises a reflective surface and an occluding device configured to selectively block one or more portions of the reflective surface to form a reflective pattern, the reflective pattern configured to reflect the infrared signal to a detector of the control system.

10. The wireless power system of claim 1, wherein each guest device of the plurality of guest devices comprises a communicator.

11. The wireless power system of claim 10, wherein the communicator is a medium range communicator.

12. The wireless power system of claim 10, wherein the communicator comprises an infrared light emitter.

13. A wireless power system, comprising:

a control system configured to output radio waves to an environment; and a plurality of portable devices, wherein each portable device of the plurality of portables devices comprises an indicator and an energy harvesting device configured to receive the radio waves and convert energy from the radio waves to direct current voltage to provide power to the indicator;

wherein a first device of the plurality of portable devices is configured to output a first device signal based at least in part on a state of the first device; and wherein a second device of the plurality of portable devices comprises a near field communicator configured to receive the first device signal and activate a second device indicator based at least in part on the received first device signal.

14. The wireless power system of claim 13, wherein the second device of the plurality of portable devices further comprises a medium range communicator.

15. The wireless power system of claim 13, wherein the state of the first device is a first state of a plurality of states, wherein the first device is configured to switch between the plurality of states, and wherein each state of the plurality of states is configured to transmit different information in the first device signal.

16. The wireless power system of claim 15, wherein the control system is configured to output a control system signal, and wherein the control system signal is configured to cause the first device to switch from the first state of the plurality of states to a second state of the plurality of states based on the control system signal.

17. The wireless power system of claim 13, wherein the first device of the plurality of portable devices comprises a sensor configured to sense the state of the first device.

18. The wireless power system of claim 17, wherein the sensor is a position sensor.

19. The wireless power system of claim 13, wherein the first device comprises a communicator configured to output the first device signal.

20. The wireless power system of claim 19, wherein the communicator comprises an optical communicator.

* * * * *